United States Patent [19]

Bronan et al.

[11] Patent Number: 5,062,903
[45] Date of Patent: Nov. 5, 1991

[54] WELDING PROCESS AND MIXTURE OF REACTANTS FOR USE IN SUCH PROCESS

[75] Inventors: Denis A. Bronan, Liberty, S.C.; James E. Whetsel, Bedford, Ohio

[73] Assignee: Erico Products, Inc,, Cleveland, Ohio

[21] Appl. No.: 620,137

[22] Filed: Nov. 30, 1990

Related U.S. Application Data

[63] Continuation-in-part of Ser. No. 406,607, Sep. 13, 1989.

[51] Int. Cl.⁵ ............................................. B23K 35/34
[52] U.S. Cl. ......................................... 148/24; 75/959
[58] Field of Search ........................... 75/959; 148/24

[56] References Cited

U.S. PATENT DOCUMENTS

| | | | |
|---|---|---|---|
| 1,872,254 | 8/1932 | Golyer | 75/959 |
| 2,569,956 | 10/1951 | Schiltknecht | 126/263 |
| 2,831,760 | 4/1958 | Rejdak | 75/959 |
| 2,870,498 | 1/1959 | Rejdak | 75/959 |
| 3,020,610 | 2/1962 | Rejdak | 75/959,3,415,697 |
| 3,415,697 | 12/1968 | Bredzs et al. | 149/109 |
| 3,899,306 | 8/1975 | Knopp et al. | 29/197 |
| 4,349,396 | 9/1982 | Mueller et al. | 149/19.3 |
| 4,881,681 | 11/1989 | Pond, Sr. | 228/198 |

Primary Examiner—Peter D. Rosenberg
Attorney, Agent, or Firm—Renner, Otto, Boisselle & Sklar

[57] ABSTRACT

The invention provides a method and means of producing weld metal for use in joining two or more metallic pieces. The method includes the steps of providing a novel mixture of reactants comprising a reducing agent, a metallic compound which is exothermically reduced by the reducing agent, and a filler metal that does not react with the metallic compound. The mixture of reactants is then exothermically reacted so as to form the weld metal for joining the metallic pieces. At least about 90 percent by weight of the weld metal is produced by the filler metal and at least about 90 percent by weight of the weld metal has a chemical composition substantially similar to that of at least one of the metallic pieces being joined.

13 Claims, 1 Drawing Sheet

WELDING PROCESS AND MIXTURE OF REACTANTS FOR USE IN SUCH PROCESS

RELATED APPLICATIONS

This application is a continuation-in-part of application Ser. No. 07/406,607 filed Sept. 13, 1989 entitled "Welding Process".

TECHNICAL DISCLOSURE

This invention relates generally to the art of welding. More particularly, the invention concerns a unique welding process and a novel mixture of reactants for use in such process. Specifically, the invention concerns a novel application of the thermite reaction to the welding process.

BACKGROUND OF INVENTION

The thermite reaction has been utilized for a long period of time in order to provide weldments normally associated with the railroad industry and in electric power transmission. The thermite reaction is comprised of a reaction between aluminum (Al) and a metal oxide wherein the metal oxide is reduced providing a filler metal, i.e., the source of the filler metal is the oxide on reduction. The "Goldschmidt" reaction is the basis of the application of the process described in U.S. Pat. No. 2,229,045 to Charles A. Cadwell. This reaction is as follows:

Aluminum + Iron Oxide =
(Al)           ($Fe_2O_3$)

heat + Aluminum Oxide + Iron (filler metal)
         ($Al_2O_3$)         (Fe)

or

Aluminum + Copper Oxide =
(Al)           (CuO)

heat + Aluminum Oxide + Copper (filler metal)
         ($Al_2O_3$)         (Cu)

The "Goldschmidt" reaction has been successfully utilized over the years to weld or join metals such as iron (Fe) and copper (Cu). However, the process is not particularly well adapted for use in joining metals such as aluminum (Al) wherein the use of a copper (Cu) or iron (Fe) filler metal is generally unacceptable.

U.S. Pat. No. 3,020,610 to Rejdak discloses a method of welding aluminum (Al) and other metals, and provides a listing of various reactions which can be utilized to produce reaction products which may be utilized to provide a weldment. Unfortunately, in the method disclosed by Rejdak the weld which is formed is not suitable for some applications. More particularly, the weld metal formed by the Rejdak method is not chemically pure enough for some applications. For example, a weldment produced by the Rejdak method in some environments may be susceptible to a high level of corrosion due to the presence of impurities or unwanted elements in the resultant weldment.

U.S. Pat. No. 2,569,956 to Schiltknecht discloses a process wherein a thermite reaction is utilized to join together a pair of non-ferrous metal pieces by melting a sleeve about the metal pieces. This process is usually referred to as the "Alusuisse Process" referring to a welding system produced by Swiss Aluminum Ltd. of Zurich. Unfortunately, the "Alusuisse Process" is an indirect welding process (i.e., the heat generated by the thermite reaction does not produce a weld filler metal by chemical reaction) and it is not suitable for use in some joining applications.

SUMMARY OF THE INVENTION

The present invention provides a new and improved method and means for producing molten weld metal for use in welding or joining two or more metallic pieces or sections which affords various distinct advantages over the prior art. More particularly, the invention provides a direct thermite welding process that is capable of producing weld metal that is substantially similar in chemical composition to the metallic pieces being joined and is thus capable of being used to join non-ferrous metals such as aluminum. Additionally, the process provides for the use of a filler metal in the mixture of reactants utilized to produce the molten weld metal having a chemical composition substantially similar to that of the metallic pieces being joined. This filler metal does not take part in the thermite reaction and it serves to produce the resultant weld metal. The invention thus allows for the use of coarser filler metals (which are generally less expensive than the finer metals required in prior art processes) and results in a slower burning reaction that evolves fewer gases.

In general the process includes the steps of providing a mixture of reactants comprising a reducing agent, a metallic compound which is exothermically reduced by the reducing agent, and a filler metal that does not react with the metallic compound. Upon exothermically reacting the reducing agent and the metallic compound heat, a metal oxide slag, evolving gases and molten weld metal are produced.

As used herein this specification and the claims below the term "weld metal" means the metal which is the resultant product of the thermite reaction exclusive of any slags or evolving gases produced by the reaction. The weld metal serves to weld or hold together the metal pieces being joined. The filler metal produces at least about 90 percent by weight of the resultant weld metal. Preferably, at least about 95 percent by weight, and more preferably at least about 97 percent by weight of the resultant weld metal is produced by the filler metal.

At least about 90 percent by weight of the weld metal has a chemical composition substantially similar to that of at least one of the metallic pieces being joined. Preferably, at least about 95 percent by weight, and more preferably at least about 97 percent by weight of the weld metal has a chemical composition substantially similar to that of at least about one of the metallic pieces being joined.

The process is particularly well suited for use with joining two or more pieces of non-ferrous metal such as aluminum (Al) or aluminum alloys. When aluminum (Al) or aluminum alloy pieces are being joined the mixture of reactants may comprise from about 20 percent to about 50 percent by weight of a metal sulfate such as, for example, magnesium sulfate ($MgSO_4$), barium sulfate ($BaSO_4$) or calcium sulfate ($CaSO_4$), from about 40 percent to about 70 percent by weight aluminum (Al) and up to 10 percent by weight of a suitable flux such as, for example, calcium fluoride ($CaF_2$). Preferably, the mixture of reactants comprises from about 25 percent by weight to about 45 percent by weight metal sulfate, from about 45 percent by weight to about 65 percent by weight aluminum (Al) and from about 2 percent by weight to about 10 percent by weight flux. More preferably, the mixture of reactants comprises from about 30 percent by weight to about 45 percent by weight metal sulfate, from about 50 percent by weight to about 65 percent by weight aluminum (Al) and from about 3 percent by weight to about 8 percent by weight flux.

The foregoing and other features of the invention are hereinafter more fully described and particularly pointed out in the claims. The following descriptions setting forth in detail certain illustrative embodiments of the invention, these being indicative, however, of but a few of the various ways in which the principles of the invention may be employed.

DETAILED DESCRIPTION

Figure 1:
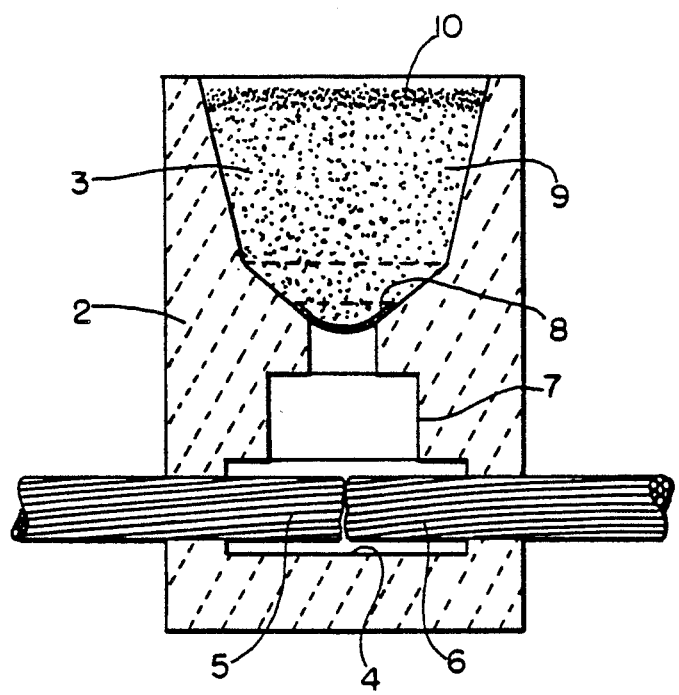
FIG. 1 is a cross-sectional view of a welding apparatus suitable for use in the present invention.

In accordance with this invention it has been found that a plurality of filler metals may be utilized via the thermite reaction to produce weldments but without having the filler metals actually enter into the reaction. Thus, in accordance with this invention, a filler metal for use in a weldment is provided into a mixture with a metallic compound which is exothermically reduced by the reducing agent to produce heat to melt the filler metal which then flows from the reactant and product mixture as weld metal to provide a weldment. Other product components are left behind in a slag with reaction gases released. The process is generally summarized as follows:

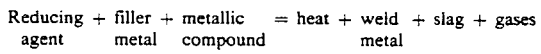
Reducing + filler + metallic = heat + weld + slag + gases
agent   metal   compound         metal In accordance with this invention it has been found with the above reaction that the reducing agent may be selected from the group consisting of aluminum (Al), magnesium (Mg), zirconium (Zr) and equivalent metals which exhibit compounds which have a high thermodynamic heat of formation with respect to the reaction product between the metal and the metallic compound to be reduced. For example, aluminum (Al) can reduce a metal oxide or sulfate forming aluminum oxide (Al$_2$O$_3$) which exhibits a heat of formation of 399 kcal/mole at 25° Celsius. Such a reaction is highly exothermic providing sufficient heat to raise the temperature of the filler metal beyond its melting point so that the molten filler metal can be directed into a weld cavity, i.e., the mold, to affect the weld and join two or more metallic pieces or sections.

The metallic compound may generally be selected from the group consisting of magnesium sulfate (MgSO$_4$), calcium sulfate (CaSO$_4$), and barium sulfate (BaSO$_4$), fluoride compounds, and equivalent materials which upon reduction contribute one or more elements to exothermically form a compound with the reducing agent. Preferably, the metallic compound is utilized in an anhydrous form and preferably all of the reactants are protected from moisture prior to use. Moisture contamination may suppress the exothermic reaction.

The reaction between aluminum (Al) and metal compounds containing oxygen, such as oxides and sulfates, is particularly useful because of the high amount of heat liberated when aluminum oxide (Al$_2$O$_3$) is formed. However, other exothermic reactions may be employed such as the one between magnesium (Mg) and polytetrafluoroethylene (C$_2$F$_4$)$_n$, forming magnesium fluoride (MgF$_2$) and providing heat to melt the filler metal. Magnesium fluoride (MgF$_2$) exhibits a heat of formation of 264 kcal/mole at 25° Celsius. The metallic compounds used in this invention generally do not, on reduction via reaction with the reducing agent, provide for a metallic phase which serves as the filler metal or becomes a part of the resultant weld metal. In fact, the metallic compounds of the present invention upon reduction via reaction with the reducing agent usually form minerals associated with the slag or oxide residual. This is in contrast to the method disclosed in Cadwell U.S. Pat. No. 2,229,045 wherein the metallic compound (i.e., iron oxide (Fe$_2$O$_3$)) provides a metallic phase on reduction to become the filler metal or resultant weld metal (i.e., iron (Fe)).

The filler metal of the present invention may be any metal which is desired to be utilized in a welding process. Because of their use in electric transmission applications, aluminum (Al) and copper (Cu) are particularly useful as filler metals to weld aluminum (Al) or copper (Cu) articles respectively. In the case of aluminum (Al) welds wherein one or more sections of aluminum (Al) are being joined, the filler metal and the reducing agent are both aluminum (Al). Whereas, in the case of copper (Cu) welds where one or more sections of copper (Cu) are being joined, mixtures or alloys of copper (Cu) and aluminum (Al) can be used to provide for the reduction process and to provide for the filler metal. Additional filler metals may be selected from the group consisting of iron (Fe), iron alloys, non-ferrous metals and alloys, solders and brazing filler metals or others where the heat from the exothermic reaction is sufficient to raise the temperature of the filler metal beyond its melting point and to provide additional superheat to the filler metal such that it is useful in producing a weld metal for joining metallic pieces.

The mixture of reactants may additionally include a flux to lower the melting point of the mixture and products. Commonly utilized fluxes such as calcium fluoride (CaF$_2$), magnesium fluoride (MgF$_2$), cryolite (Na$_3$AlF$_6$), and other substances such as alkali compounds, particularly alkali silicates and fluorosilicates, can be used to lower the fusion point and increase the fluidity of the reaction products (i.e., "slag") such that the molten filler metal can readily be separated from the slag and flow into the mold cavity.

An unexpected advantage has been found with regard to the particle sizes of reactants utilized in the process of this invention. In the prior art of thermite welding, the materials utilize aluminum (Al) at a particle size smaller than 325 Mesh (i.e., less than 44 micrometers in diameter). The metal oxide is normally utilized at a larger particle size than 325 Mesh. In accordance with this invention, when the reducing agent aluminum (Al) is employed it may be utilized at a particle size of greater than 325 Mesh for greater than 90% of the aluminum (Al) by weight. This has two unexpected advantages. This brings about a reaction rate which exhibits a uniformly slow burning rate with low gaseous emissions. A second advantage is that the coarser aluminum (Al) is less expensive than the finer materials normally required.

An additional unexpected advantage of this invention is that the filler metals can produce weld metal comprising 97% or greater of the desired element or alloy. There is believed to be currently no direct thermite process in existence for welding aluminum (Al) conductors providing for this kind of purity in the weld metal. Since much of the world's power transmission is accomplished with aluminum (Al) conductors, this means that the process of this invention is a more effective and efficient substitute for mechanical connectors which must be maintained or eliminates the requirement for expensive TIG (gas tungsten-arc welding) or MIG (metal inert-gas welding) welding.

The process of this invention also helps to eliminate segregation in the weld metal caused by limited solubility of constituents such as aluminum (Al) and tin (Sn) as found in the prior art thermite process for welding aluminum (Al) conductors. The process also helps to eliminate the presence of elements causing galvanic corrosion thus providing outdoor connections for power transmission and grounding. The process also eliminates additional steps or equipment as required with the "Alusiuisse Process" or furnaces used in foundry welding operations.

The process of this invention also allows for the use of permanent steel molds when welding aluminum (Al) or its alloys. The reactant mixtures of this invention require high temperatures for initiation of the reaction thus helping to provide for safety in use. The reactions are slow and steady thus helping to prevent violence and the slag materials should not present a disposal problem.

The process of this invention is particularly well adapted for use with the welding apparatus formed from two graphite blocks or various other materials as shown in U.S. Pat. No. 3,020,610 to Rejdak. The entire disclosure of the Rejdak U.S. Pat. No. 3,020,610 is incorporated herein by reference. FIG. 1 is an example of a welding apparatus 1 which may be utilized with the present invention. Welding apparatus 1 comprises a pair of blocks 2 which are hollowed out to provide an upper crucible portion 3 and a mold cavity portion 4. Blocks 2 are releasably connected or clamped using any one of a variety of means. Metallic pieces, or more particularly, cable ends 5 and 6 are clamped in the mold cavity portion 4 with their opposed ends located substantially vertically below sprue 7 which is closed by means of a small metal disc 8. The mixture of reactants 9 is then placed in the crucible portion 3 and a starting material 10 may then be placed on top of the mixture of reactants 9. The starting material 10 may then be ignited with a flint gun, which in turn ignites the exothermically reacting mixture of reactants 9 to produce molten metal which melts through disc 8 and drops into mold cavity portion 4 thereby contacting and joining the ends of the cables 5 and 6. It will be appreciated that in addition to a flint gun alternative ignition means may be employed such as an electrical ignition system as disclosed in Amos et al. U.S. Pat. No. 4,885,452. The disclosure of the Amos et al. U.S. Pat. No. 4,885,452 is incorporated herein by reference.

Having generally described the process of this invention, the following specific Examples are given:

EXAMPLE 1

A thermite reaction per the teachings of this disclosure was conducted as follows in a ceramic crucible set over a steel mold which holds cables to be joined and provides for a casting mold at the cable junction using the following thermite mixture:

| Constituent | Weight Percent |
|---|---|
| Magnesium Sulfate ($MgSO_4$) | 38.6 |
| Aluminum (Al) Powder | 57.6 |
| Calcium Fluoride ($CaF_2$) | 3.8 |

Particle Size Distributions of Materials Used in Examples

MAGNESIUM SULFATE ($MgSO_4$)

<44 micron - 100%

ALUMINUM (Al) POWDER

| | | | |
|---|---|---|---|
| +20 Mesh | >840 microns | 100% | (by weight) |
| −20 +40 Mesh | 420–840 microns | 5% Max | |
| −40 +50 Mesh | 300–420 microns | 1–10% | |
| −50 +80 Mesh | 180–300 microns | 15–30% | |
| −80 +140 Mesh | 100–180 microns | 35–50% | |
| −140 +325 Mesh | 44–180 microns | 25–45% | |
| −325 Mesh | <44 microns | 5 Max | |

CALCIUM FLUORIDE ($CaF_2$)

| | | | |
|---|---|---|---|
| +50 Mesh | >300 microns | 2% Max | |
| −50 +100 Mesh | 150–300 microns | 0–10% | (by weight) |
| −100 +140 Mesh | 100–150 microns | 5–20% | |
| −140 +200 Mesh | 74–100 microns | 10–25% | |
| −200 +325 Mesh | 44–74 microns | 20–40% | |
| −325 Mesh | <44 microns | Balance | |

A weld metal nugget is subjected to chemical analysis and the following welding metal composition was found (weight percent):

| | |
|---|---|
| Aluminum (Al) Powder | 97.2 |
| Silicon (Si) | 0.1 |
| Magnesium (Mg) | 0.2 |
| Sulfur (S) | 1.7 |

The weldments made by this process were further tested by sequentially dipping them in simulated seawater (3.5% sodium chloride (NaCl) in distilled water) followed by drying. In a one month process, welds made by this method do not exhibit signs of corrosion whereas those made per existing technology and disclosed in Rejdak U.S. Pat. No. 3,020,610 and containing tin (Sn) and copper (Cu) all exhibit signs of corrosion.

EXAMPLE 2

Two pieces of 250 MCM aluminum (Al) cable (19 strand-diameter 0.575 in. were welded together using the process of Example 1.

EXAMPLE 3

Two pieces of 2/0 aluminum (Al) cable (7 strand - diameter 0.419 inches) were joined by the process of Example 1 obtaining a resistance of 100 micro-ohms (not that total resistance is greatly affected by the measuring technique with stranded cable and, therefore, comparative values are very important when a common technique has been used.)

EXAMPLE 4

Thermite reactions per the teachings of this disclosure were conducted in a graphite crucible and mold using the following mixture to effect welds in 2/0 aluminum (Al) cable segments:

| Constituent | Weight Percent |
|---|---|
| Calcium Sulfate ($CaSO_4$) | 35.67 |
| Aluminum (Al) Powder | 57.49 |
| Calcium Fluoride ($CaF_2$) | 6.84 |

Particle Size Distributions of Materials Used in Examples

CALCIUM SULFATE ($CaSO_4$)

-continued

| | | |
|---|---|---|
| <20 micron | 100% (by weight) | |
| <10 | 95% | |
| <5 | 63% | |
| <2 | 23% | |
| <1 | 9% | |
| ALUMINUM (Al) POWDER | | |
| +20 Mesh | >840 microns | 100% (by weight) |
| −20 +40 Mesh | 420–840 microns | 5% Max |
| −40 +50 Mesh | 300–420 microns | 1–10% |
| −50 +80 Mesh | 180–300 microns | 15–30% |
| −80 +140 Mesh | 100–180 microns | 35–50% |
| −140 +325 Mesh | 44–180 microns | 25–45% |
| −325 Mesh | <44 microns | 5% Max |
| CALCIUM FLUORIDE (CaF$_2$) | | |
| +50 Mesh | >300 microns | 2% Max |
| −50 +100 Mesh | 150–300 microns | 0–10% (by weight) |
| −100 +140 Mesh | 100–150 microns | 5–20% |
| −140 +200 Mesh | 74–100 microns | 10–25% |
| −200 +325 Mesh | 44–74 microns | 20–40% |
| −325 Mesh | <44 microns | Balance |

The joined cables were tested for resistance and ultimate tensile strength. Duplicate welds were sectioned to detect the presence of porosity and to evaluate fusion of cable ends. Results were as follows:

| A. Resistance and Tensile Strength | | |
|---|---|---|
| | Resistance (micro-ohms, 12" gauge) | Tensile Strength (lb/in$^2$) |
| Unsectioned Cable | 139 | 6348 |
| Welded Cable | 132–137 | 1670–2387 |

| B. Porosity |
|---|
| Results ranged from no voids visible to the naked eye to less than three voids located near the top of the weld nugget. |

| C. Fusion of Cable Ends |
|---|
| Cable ends, including central strands, were fused to the filler metal. |

EXAMPLE 5

Thermite reactions per the teachings of this disclosure were conducted using a ceramic crucible set over a graphite mold using the following thermite mixture to affect welds in 2/0 aluminum (Al) cable:

| Constituent | Weight Percent |
|---|---|
| Barium Sulfate (BaSO$_4$) | 49.32% |
| Aluminum (Al) Powder | 44.46% |
| Calcium Fluoride (CaF$_2$) | 6.22% |

| Particle Size Distributions of Materials Used in Example | | |
|---|---|---|
| BARIUM SULFATE (BaSO$_4$) | | |
| <11 micron | 100% (by weight) | |
| <6 | 87 | |
| <2 | 29 | |
| ALUMINUM POWDER (Al) | | |
| +20 Mesh | >840 microns | 100% (by weight) |
| −20 +40 Mesh | 420–840 microns | 5% Max |
| −40 +50 Mesh | 300–420 microns | 1–10% |
| −50 +80 Mesh | 180–300 microns | 15–30% |
| −80 +140 Mesh | 100–180 microns | 35–50% |
| −140 +325 Mesh | 44–180 microns | 25–45% |
| −325 Mesh | <44 microns | 5% Max |
| CALCIUM FLUORIDE (CaF$_2$) | | |
| +50 Mesh | >300 microns | 2% Max |
| −50 +100 Mesh | 150–300 microns | 0–10% (by weight) |
| −100 +140 Mesh | 100–150 microns | 5–20% |
| −140 +200 Mesh | 74–100 microns | 10–25% |
| −200 +325 Mesh | 44–74 microns | 20–40% |
| −325 Mesh | <44 microns | Balance |

Good quality welds were obtained with acceptable fusion of cable ends with a small amount of porosity in the weld cavity.

EXAMPLE 6

Weldments of ¼"×4" aluminum (Al) busbar in a straight splice were made using the process disclosed in Rejdak U.S. Pat. No. 3,020,610, the method disclosed above in EXAMPLE 4 and utilizing the following formula:

| Constituent | Weight Percent | Approximate Mean Particle Size |
|---|---|---|
| Calcium Sulfate (CaSO$_4$) | 34.2 | 10 microns |
| Aluminum (Al) Powder | 55.1 | 150 microns |
| Calcium Fluoride (CaF$_2$) | 6.6 | 20 microns |
| Silicon (Si) | 4.2 | 150 microns |

Thus, the process of the present invention may be successfully utilized with an alloying element such as silicon (Si) incorporated in the mixture of reactants.

It is thus seen that the process of this invention provides a novel process for producing weldments and a novel process for the utilization of the thermite reaction to produce weldments.

Although the invention has been shown and described with respect to certain preferred embodiments, it is obvious that equivalent alterations and modifications will occur to others skilled in the art upon their reading and understanding of this specification. The present invention includes all such equivalent alterations and modifications, and is limited only by the scope of the following claims.

That which is claimed is:

1. A process for producing molten weld metal for use in joining at least two metallic pieces comprising:
   (A) providing a mixture of reactants comprising a reducing agent, a metallic compound which is exothermically reduced by such reducing agent and a filler metal that does no chemically react with such metallic compound or such reducing agent upon the exothermic reaction of such reducing agent and such metallic compound; and
   (B) exothermically reacting such reducing agent and such metallic compound so as to generate sufficient heat to melt such filler metal and form such molten weld metal for joining such metallic pieces, at least 90 percent by weight of such molten weld metal being formed by such filler metal.

2. A process as set forth in claim 1 wherein at least about 90% by weight of such weld metal includes a chemical composition which is substantially similar to that of at least one of such metallic pieces being joined.

3. A process as set forth in claim 1 wherein such mixture of reactants includes a flux and such flux comprises at least one compound selected from the group consisting of calcium fluoride (CaF$_2$), magnesium fluoride (MgF$_2$), cryolite (Na$_3$AlF$_6$), alkali silicates and fluorosilicates.

4. A process as set forth in claim 1 wherein at least about 95% by weight of such weld metal is formed by such filler metal.

5. A process as set forth in claim 1 wherein at least about 97% by weight of such weld metal is formed by such filler metal.

6. A process as set forth in claim 1 wherein at least about 95% by weight of such weld metal has a chemical composition substantially similar to that of at least one of such metallic pieces being joined.

7. A process as set forth in claim 1 wherein at least about 97% by weight of such weld metal has a chemical composition substantially similar to that of at least one of such metallic pieces being joined.

8. A process as set forth in claim 1 wherein at least one of such metallic pieces comprise aluminum (Al) or an aluminum (Al) alloy.

9. A process as set forth in claim 1 wherein such reducing agent comprises aluminum (Al).

10. A process as set forth in claim 1 wherein such filler metal comprises aluminum (Al).

11. A process as set forth in claim 1 wherein such mixture of reactants comprises from about 20 percent by weight to about 50 percent by weight of a metal sulfate, from about 40 percent by weight to about 70 percent by weight of aluminum (Al) and up to about 10 percent by weight flux.

12. A process as set forth in claim 11 wherein such metal sulfate is selected from a group consisting of barium sulfate ($BaSO_4$), calcium sulfate ($CaSO_4$) and magnesium sulfate ($MgSO_4$).

13. A process as set forth in claim 1 including the steps of placing such mixture of reactants into the crucible portion of a welding apparatus and placing a portion of such metallic pieces into the mold cavity portion of such welding apparatus.

* * * * *